C. H. VAN ARNAM.
Nut-Lock.

No. 206,280.   Patented July 23, 1878.

Witnesses
Bernard Blair
Charles S. Brintnall

Charles H. Van Arnam
By W. E. Hagan his atty
Inventor

UNITED STATES PATENT OFFICE.

CHARLES H. VAN ARNAM, OF LANSINGBURG, NEW YORK.

IMPROVEMENT IN NUT-LOCKS.

Specification forming part of Letters Patent No. 206,280, dated July 23, 1878; application filed December 8, 1877.

*To all whom it may concern:*

Be it known that I, CHARLES H. VAN ARNAM, of the village of Lansingburg, county of Rensselaer and State of New York, have invented a new and Improved Spring-Key for Securing Threaded Nuts, of which the following is a specification:

The nature of my invention consists in a manner of constructing a spring-key, threaded nut, and threaded bolt, so that the nut may be kept from turning upon the thread, and have two or more positions upon each revolution of the nut, where the nut and bolt may be secured by the key when it is desired to tighten or loosen the nut.

In the accompanying drawing there are three illustrations of my invention, in which like letters designate like parts.

Figure 1:
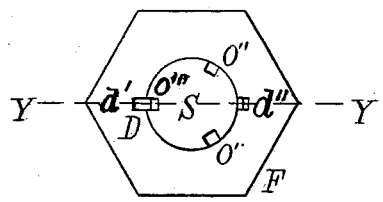
Figure 2:
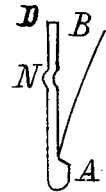
Figure 3:
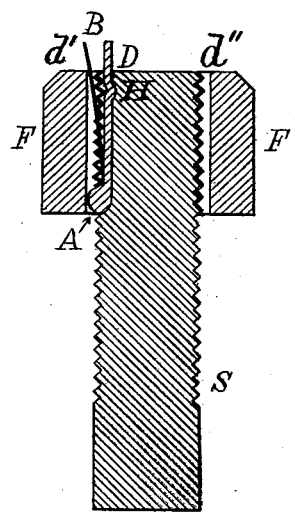

Figure 1 shows a top view of the nut, bolt, and spring-key combined. Fig. 2 illustrates the spring-key removed; and Fig. 3 shows a vertical section of Fig. 1, taken on the line $y\,y$.

Upon the sides of the bolt are cut three grooves, perpendicular to the threads and parallel to the sides of the bolt; and in the illustration shown in Fig. 1 there are three such grooves, designated at $O'\,O''\,O'''$ as formed in the outer edge of the bolt S. Upon the inside of the threaded nut F there are shown two grooves cut parallel to the inside of the nut, and corresponding in size to those cut on the outside of the bolt. These grooves in the nut are designated at $d'$ and $d''$ in Fig. 1, and at Fig. 3 in vertical section, with a recess formed in the groove, as shown at H. The spring-key D is illustrated in Fig. 2 as detached from the connection, and in Fig. 3, in vertical section, as applied. It is provided with the leaf-spring B, attached to its lower end, with a terminal projection, A, and a side projection, N, the the latter corresponding with the recess formed in the bolt-grooves, and as shown at H, Fig. 3.

The operation of the constructed and combined parts is as follows: When the spring-key is forced down into the grooves opposite each other in the nut and bolt, the projection N fits into the recess H, while the bottom projection A and the leaf-spring B keep the key securely held in position, so that it will not jar out, and thus secures the nut from turning. When it is desired to unscrew or tighten the nut, the spring-key is withdrawn and the nut screwed on or off until one of the grooves in the nut comes opposite one in the bolt, when the spring-key is again inserted.

While I have shown three grooves in the bolt, more may be arranged if desired, and more than two employed in the nut also; and the recess shown as formed in the grooves in the bolt may be placed in the grooves cut in the nut, and produce the same result.

A single groove provided with a recess to receive the spring-key may be formed in either the bolt or nut, and a simple groove to correspond in size in the other part not containing the recess, and the key-spring will answer the same purpose in most cases of use.

I am well aware that a key has been used before for the same purpose; but when not combined with the spring-detaining projections and recess, it was liable to work out, and failed to keep the nut secured.

Having thus described my invention, what I claim, and desire to secure by Letters Patent, is—

The key D, leaf-spring B, and projections N and A formed on the key, in combination with the recess H and groove $O'$ formed in the threaded bolt S, and the groove $d'$ formed in the threaded nut F, arranged to operate as and for the purposes herein described and set forth.

CHARLES H. VAN ARNAM.

Witnesses:
 BERNARD BLAIR,
 JUSTIN KELLOGG.